Nov. 7, 1944.   H. E. KOEHLER   2,362,140
TURRET TOOL POST
Filed Dec. 28, 1942   2 Sheets-Sheet 1
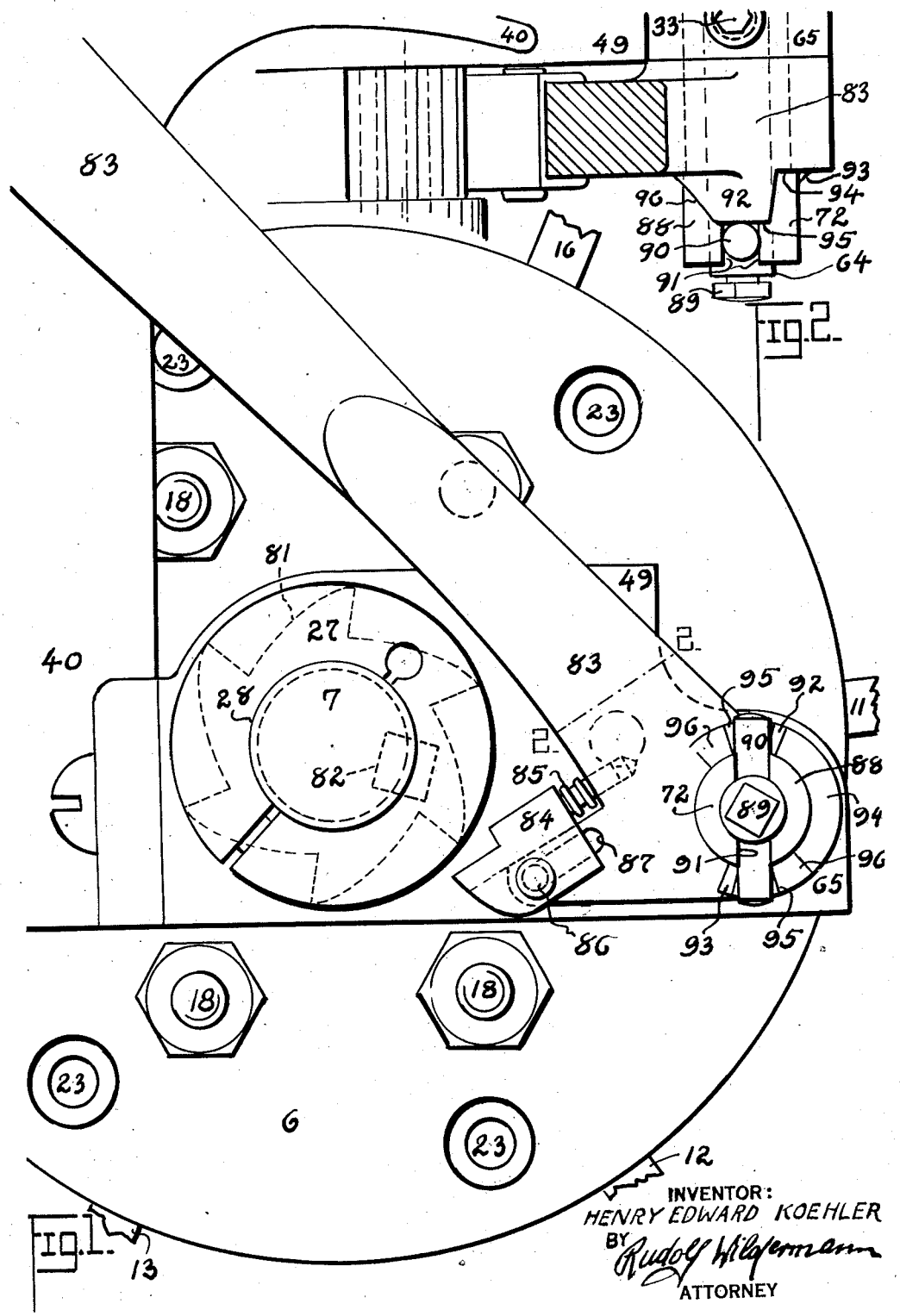
INVENTOR:
HENRY EDWARD KOEHLER
BY Rudolf Wilhelmann
ATTORNEY

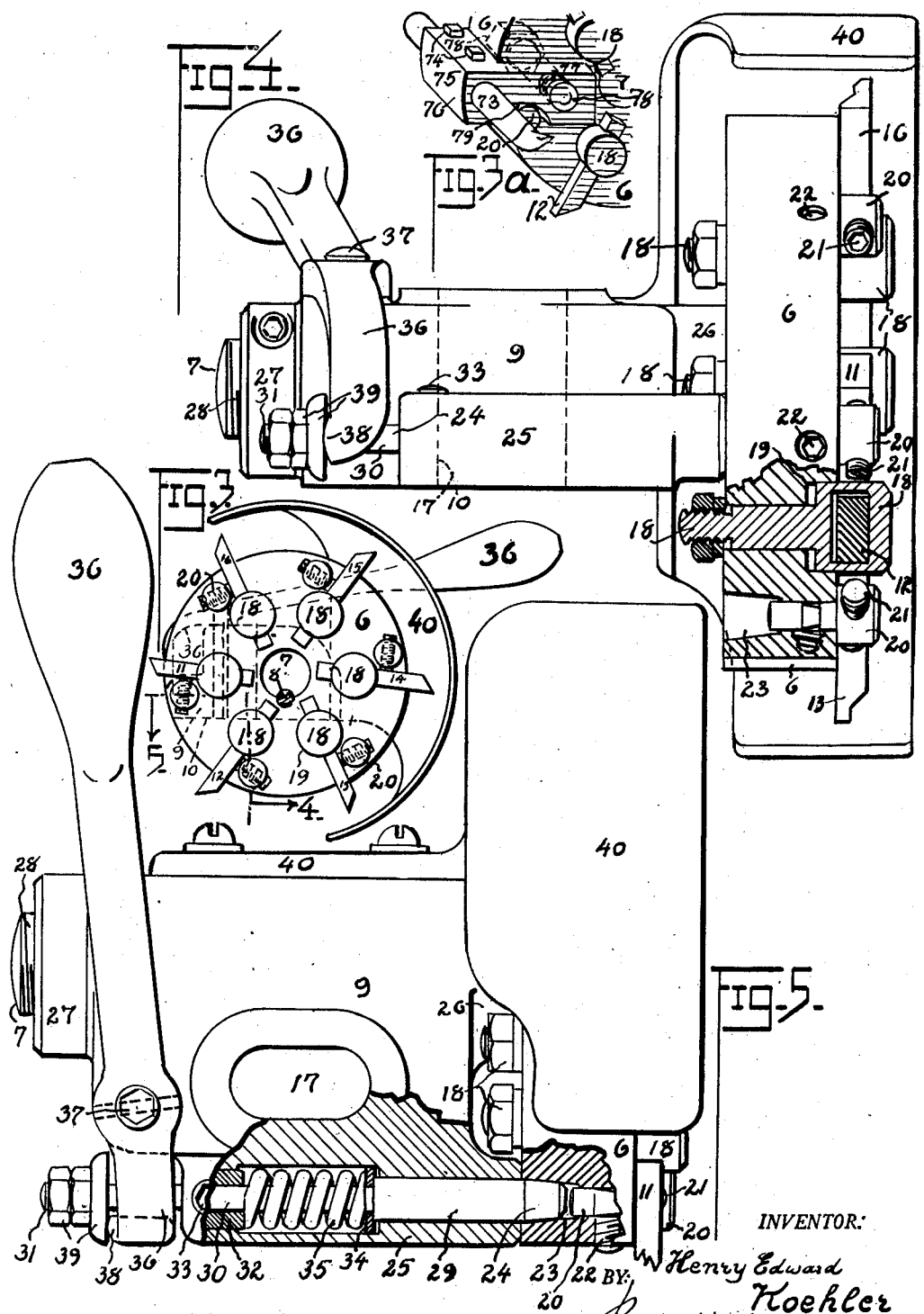

Patented Nov. 7, 1944

2,362,140

UNITED STATES PATENT OFFICE 2,362,140

TURRET TOOL POST

Henry Edward Koehler, Ridgewood, N. Y.

Application December 28, 1942, Serial No. 470,323

7 Claims. (Cl. 29—49)

This invention relates to a post or holder for boring, cutting, spinning, knurling, burnishing and similar tools, which may be adjustably and detachably accommodated upon various machine tools. A post or holder of this invention is particularly adapted for bringing a variety of tools successively into play on a work piece, and to repeat such rotation of operations on a number of similar work pieces. Since a revolving turret is used as a post or holder for the different tools, the device of this invention is called a turret tool post.

Such a turret tool post will find its most frequent use upon a slide rest, e. g. upon the compound slide rest of an engine lathe and, as illustrated herein, it is principally adapted for such purpose. By means of such a tool post a simple engine lathe may be converted for economic manufacture of limited quantities of a product. The manufacture is expedited, because a number of tools may operate in succession upon a piece of work, which remains mounted, e. g. chucked, only once for all these operations so that the piece of work is always predeterminedly and accurately positioned for the next tool, whereas ordinarily work pieces to be operated upon are first chucked, in succession, for repeating an operation on each one by one tool. Then a second tool is mounted upon the machine tool for a second operation, and the same quantity of work pieces is again mounted in succession for said operation, etc.

By means of such an inexpensive turret tool post, the ordinary engine lathe may therefore compete with turret lathes, semi-automatic screw machines, etc. For such reasons we find various designs of turret tool posts in the prior art. Still such multiple tool posts were not generally used nor known because they are not firm and steady, there is chattering and vibration and that prevents good and accurate workmanship. Or, if a turret tool post was designed for permitting good and accurate work, it was either too clumsy, or too complicated or both, so that its use was not economical.

These and other disadvantages of turret tool posts of the prior art are to be overcome according to the principal object of this invention. Other objects will be learned and recognized from the following description of some specific embodiments of the instant invention, which are given by way of illustration, but not by way of limitation of the invention.

In the drawings:

Fig. 1 is a rear view of a device of this invention, which illustrates, in particular, an arrangement for a semi-automatic change of tools.

Fig. 2 is a corresponding sectional top view in which the handle arm of the lever is cut away where indicated at 2—2 in Fig. 1.

Fig. 3 is a front view of another embodiment of the invention, which lacks the semi-automatic tool change, but is otherwise similar to the device of Figs. 1 and 2.

Fig. 3a illustrates, in a perspective sectional view, a boring tool accommodated in an operative position of the device.

Fig. 4 is a side view of the device shown in Fig. 3. The view is partly a cross-section along a dot-dash line pointed out by the numeral 4 in Fig. 3.

Fig. 5 is a corresponding top view. This view is cross-sectioned in part, i. e. at a level indicated by the numeral 5 in the showing of Fig. 3.

In comparison with the views of Figs. 4 and 5, Fig. 3 is on a reduced scale, whereas the other embodiment of Figs. 1 and 2 is shown in an enlarged scale.

Similar numerals refer to similar parts throughout the various views:

The collective tool holder or disc 6 is fixedly and concentrically assembled with a spindle 7, the parts being for instance held together by a headless screw 8 inserted at the circle where the parts engage upon each other by a counter bore and thread or in any other known manner.

In a device of Figs. 3–5 the spindle 7 is idlingly journalled in a block 9 which is mounted upon a machine. When the device is to be mounted, for instance, upon an engine lathe which has a head stock to the left, the bottom surface 10 of tool holder block 9 is deposited upon the top of the cross-slide of the compound slide rest and is suitably clamped down, e. g. by an inverted bolt, the head of which is accommodated in the T-slot of the cross-slide, said bolt extending through the elongated aperture 17 in the holder block 9. A nut applied to the bolt will then clamp the device down onto the cross-slide and a segment of the disc 6 will depend to the left below the surface of the cross-slide i. e. below the bottom surface 10 of tool holder blocks 9. If so desired, raising blocks may be inserted between the cross-slide and the tool holder block 9 in order to arrange the turret tool post at a preferred level relatively to the axis of the head stock.

Cutting tool 11 is shown in such a position in view of Fig. 3, that it can cut a piece of work held in the head stock of an engine lathe, if the turret tool post is mounted upon the compound slide rest of such lathe in the manner just described, and if disc 6 is locked upon block 9 in the position of Fig. 3. After tool 11 has carried out its operation, disc 6 may be unlocked, and successively, i. e. in each instance by angular rotation through 60°, tools 12, 13, 14, 15 and 16 may be swung into position of cutting tool 11, each may be locked in such position, and may then perform the work assigned thereto.

So far as just generally described, the turret tool post of the instant invention resembles turret tool posts of the prior art.

A turret tool post of this invention differs however over the prior art concerning the manner in which the tools 11—16, more or less, are mounted upon a collective tool holder, e. g. discs 6, and above all concerning the manner in which such collective tool holder or disc is locked in a fixed position for the operation of each tool. It appears that the prior art universally provided either a positive lock engaging upon the spindle of the collective tool holder, such as spindle 7. It then relied upon the heaviness and ruggedness of the spindle and the tool holder for preventing vibration and shattering. Or, in some instances the prior art provided a lock by blocking rotation of the collective tool holder in only the direction of reaction of the cutting tool, which would be a counter-clockwise direction in connection with the showing of Fig. 3.

I have found that such locking means are not satisfactory. A good lock in both directions near the point of operation, e. g. near the periphery of and on the disc 6 is desired, preferably close to the tool which is in an operative position, in each instance. Then sheet bulk and weight of the parts do not have to be relied upon for steadying the tool as it has been the case in the prior art.

Each one of the tools 11—16 may be retained by the collection tool holder 6 in the manner in which the ordinary tool is retained by its tool shank. The drawings show a clamping bolt 18, washer and nut for each of said tools. The head of bolt 18 has a transverse rectangular opening large enough to accommodate the largest tool to be used. The collective tool holder or disc 6 provides for holes arranged in a circle, through each of which the clamping bolts 18 for one of the tools may be passed and each of said holes has a countersink 19 fitting the head of the respective clamping bolt. Thus the tools 11—16 may be drawn by the clamping bolt 18 from the back side of the disc 6 onto the surface of the disc, and firmly clamped thereonto. Alongside of each clamping bolt 18, preferably below and to the outside, a rake adjusting post 20 is arranged. The head of each post 20 transversely accommodates an adjustable screw 21, upon which rests the respective tool 11—16. The shank of each post 20 extends into a bore in the collective tool holder or disc 6, in which it is retained by a set screw 22. Set screws 22 permit angular adjustment of the post 20, so that the posts 20 may be angularly adjusted and that the faces of screws 21 extend at the desired angle of top rake.

In connection with each clamping bolt 18 I provide near the periphery of the collective tool holder or disc 6, and preferably at a pitch circle larger than that on which the clamping bolts 18 are arranged, a dowel pin hole on the back of the collective tool holder 6, into which may be reciprocated, out from and back into the tool holder block 9, a dowel preventing rotation of the collective tool holder or disc 6 when the respective tool 11—16 is in action. In the drawings I show these dowel pin holes as tapered holes 23 and for the sake of convenience and simplicity the tapered holes 23 are arranged opposite the holes accommodating the rake adjusting post 20 and merge with said holes. Such allocation of the tapered holes, i. e. at or outside of the circle of clamping posts 18, and also therebelow, offers particular sturdiness.

The tapered pin 24, which may be selectively injected into a tapered hole 23 corresponding to one of the tools 11—16, is longitudinally reciprocatedly accommodated in a lug 25 leading out sideways from the tool holder block 9 below the cutting position. Said lug 25 extends into sliding abutment with the rear surface of disc 6, e. g. its face is in a plane with the face of hub 26 which projects from tool holder blocks 9 and accommodates spindle 7 and, in endthrust, disc 6. End play of spindle 7 may be taken up by a split clamping nut 27, which is arranged upon the fine thread 28 at the rear end of spindle 7.

In order to be reciprocatable, the tapered front end of tapered pin 24, which fits the tapered hole 23, adjoins a cylindrical portion 29, which fits the corresponding bore at the front of lug 25. Behind said bore the hole in lug 25 becomes larger, whereas the diameter of the pin 24 is reduced, the reduced portion 30 having a threaded rear end 31. Reduced portion 30 fits the bore of a bushing 32 retained by a set screw 33 in the rear end of the hole extending through lug 25. A washer 34 on portion 30 rests against the shoulder at the rear end of portion 29. Between said washer 34 and bushing 32 a strong compression spring 35 surrounds the tapered pin and forces it into that tapered hole 23 which is aligned and registers therewith at the moment. This arrangement locks and effectively steadies the collective tool holder in each of the operative positions corresponding to the tools 11—16. When the tapered pin is withdrawn from disc 6, that disc may be rotated to any other operative position, and pin 24 will steady the tool post in the new position as soon as allowed to snap into the respective tapered hole 23.

A handle lever 36 serves for the withdrawal of the tapered pin from tapered hole 23. Lever 36 is fulcrumed by way of a stud 37 fastened thereon upon a corner of the tool holder block 9. At its free end it has a lug 38, which will be pressed, by actuation of the lever 36, onto one side of the flanged nut assembly 39 accommodated on thread 31 at the rear end of tapered pin 24.

It has been described above how a device of this invention is mounted upon the compound slide rest of an engine lathe. The work piece is mounted, e. g. chucked on the head stock of the lathe, and tools 11—16 are selected for successive operation upon such a piece. The first tool 11 is inserted at the position of the collective tool holder 6 into the respective clamping bolt 18, where such a holder is anchored by the tapered pin 24. Then the post 20 is angularly adjusted and screw 21 is longitudinally adjusted therein, so that the screw 21 extends normal to the tool 11, and said tool rests thereagainst at the desired top rake. Then the desired operation is performed with tool 11, after clamping bolt 18 has been drawn tight. The positions at which the tool 11 has finished the assigned operation may be suitably marked in connection with the compound slide rest, or stops may be provided thereon, and on the bed of the lathe for such purpose, as commonly known in the art. Then the disc 6 is released by manipulation of lever 36, i. e. that lever is swung in a clockwise direction (Fig. 5). At the same time the released disc 6 is moved in a clockwise direction (Fig. 3). Lever 36 is released, the tapered pin comes to rest upon the rear surface of disc 6, but will eventually drop into a tapered hole 23, if the clockwise rotation of the disc 6 is continued. The collective tool holder or disc 6 is now in a position to receive tool 12 which is mounted thereon, and used upon the work piece in the manner corresponding to that previously described in connection with tool 11. Correspondingly the other tools 13 to 16 are successively mounted upon the collective tool holder 6 and put into operation. When the operator again reaches the operative position of tool 11, the finished work piece may be removed from the head stock, is replaced by a blank piece, and the operations of tools 11 to 16 are repeated on the new work piece, disc 6 being rotated at the end of each operation, after the lock has been freed by manipulation of lever 36, and is then anchored in the position corresponding to the next tool, by the released tapered pin 24.

It is observed that the tools 11 to 16 may be replaced or sharpened without changing their top rake, the operator firmly positioning the new or sharpened tool against the screw 21 in post 20 when he tightens up on the respective clamping bolt 18.

Fig. 3a serves to illustrate, how other tools may be accommodated upon a disc 6 of a device of this invention. A boring tool 73 takes, for instance, the place of the cutting tool 11 in the operative position. It is shown to be held by set screws 74 in one shank 75 of the L-shaped boring tool holder 76. Shank 75 clears the periphery of disc 6 and the other shank 77 extends flatly onto the surface thereof over the bore 19 where it has a tapped hole, into which extends bolt 78 from the back of disc 6 and draws the boring tool holder 76 tightly onto the disc 6. A crescent clearance 79 at the bottom of shank 77 clears the rake adjusting post 20. Like all tools mounted or to be mounted on disc 6 the boring tool holder 76 clears the inside of guard 40.

The drawing shows a guard 40 to be attached to that side of the block 9 where the operator faces the device. Guard 40 extends over the corresponding side and over to the top of the disc 6, being substantially concentrically spaced to provide clearance for tool 11—16.

It may be desirable to combine the operations of changing the position of the collective tool holder or disc 6 from that of one of the tools 11 to 16 to that of another, with the operation of releasing and reanchoring said disc 6 so that these operations are effected by a single back and forth movement of a lever. This is illustrated by the embodiment of Figs. 1 and 2, the arrangement of which corresponds otherwise substantially to that of the embodiment of Figs. 3–5:

Here I provide for a lever which may be oscillated between two extreme positions. When moved in one direction it withdraws the tapered pin, so that at its first position the tapered pin fully anchors the disc 6, whereas at and near its other extreme position said lever holds the pin in a position in which the disc is free to turn. During the return stroke there is a reversal of said operation. But during said return stroke the lever also rotates the disc, so that at the end of that return stroke, the tapered pin drops into the disc and anchors it in a new position.

In the modifications of Figs. 1 and 2, the tool holder block 49 is shown to be flush in the rear with lug 65, which leads out sideways therefrom and accommodates the tapered pin 64. Between said rear of the tool holder block 9 and the slit clamping nut 27 the spindle 7 accommodates a ratchet 81, which participates in the rotation of spindle 7 and disc 6, being for instance attached upon the spindle 7 by a feather key 82. The number of teeth of ratchet 81 corresponds to the number of tool positions upon disc 6 which are six in the example shown.

A handle lever 83 is fulcrumed upon the tool holder block 49 or upon the lug 65. A lateral extension on said lever 83 slidably accommodates a pawl 84, which is normally pressed outwardly by a compression spring 85. The pawl 84 is checked as to its outmost position by a rivet 86 extending thereacross through a slot 87 which is disposed in the direction of movement of pawl 84.

Lever 83 is normally substantially vertically disposed. Fig. 1 indicates it in its extreme position of oscillation, and during the return of the lever from such extreme position to its normal position pawl 84 will engage upon one of the teeth of ratchet 81 and will rotate spindle 7 and collective tool holder or disc in a counter-clockwise direction (Fig. 1).

As illustrated, lever 83 is fulcrumed upon a bushing 72 which extends from lug 65 around tapered pin 64. Bushing 72 has a slotted head 88 at its end which endwise retains the lever 83. That bushing 72 corresponds to bushing 32 of the embodiment of Figs. 3–5, but it also extends out to the back of the lug 65. Tapered pin 64 corresponds to tapered pin 24 of said embodiment, except that its reduced portion likewise extends to the back, subtsantially to the distance of bushing 72. Near its rear end said tapered pin 64 retains, e. g. by means of a set screw 89, a rod 90 transversely extended therethrough. Rod 90 is slidably accommodated in the slot 91 which extends in bushing 72 to the length of head 88.

Upon opposite sides of head 88 and sectorially extended therearound, the hub of lever 83 has a pair of cam formations 92 and 93, which arise from the face 94 of said hub.

The pressure of spring 35 forces the opposite ends of rod 90 to rest against the top dwell 95 of cam formations 92 and 93. When the lever 83 is shifted from the extreme position of Figs. 1 and 2 into a substantially upright position, rod 90 will ride down upon the inclines 96 of cam formations 92 and 93, unless forward movement of the tapered pin 64 is intercepted by the disc 6. But eventually the said tapered pin will slide from the back side of disc 6 into one of the tapered holes 23 as disc 6 is rotated by the pawl 84 engaged upon ratchet 81, and will then arrest the rotation. Rod 90 will however never slide or drop down onto the surface 94 of the hub of lever 83, because the rod remains spaced from said surface, at least for a short distance, even after the tapered pin 64 has locked in one of the tapered holes 23.

When the tapered pin 64 is engaged in one of the tapered holes 23, the lever 83 stands substantially upright, possibly leaning slightly to the right (Fig. 1). When the operation of the tool for which the device is thus positioned has been finished, and the operator desires to change to the next tool, e. g. from tool 11 to tool 12, he brings lever 83 into the position of Figs. 1 and 2, during which stroke rod 90 rides up on riser 96 onto dwell 95, i. e. the tapered pin is withdrawn, and the pawl snaps over one of the teeth of the ratchet which stands still.

During the return stroke from the position in which it is shown in Figs. 1 and 2, lever 33 will rotate disc 6 by way of pawl 84 engaging ratchet 81, until tapered pin or plunger 64 drops into the next tapered hole 23, and the next tool, tool 12, is lodged in operative position.

By disc I understand herein an element adapted to accommodate a plurality of tools in relatively angularly grouped in a circle.

Having thus described my invention in detail, yet I do not wish to be limited thereby, except as the state of the art and the appended claims may require, for it is obvious that various modifications and changes may be made in the form of embodiment of my invention, without departing fro the spirit and scope thereof.

I claim:

1. A turret tool post comprising a revolvable disc perforated by holes arranged in a circle, tool clamping bolts mounted in said holes and having slotted heads at their front ends for clamping tools onto said disc, rake adjusting posts mounted in openings in the disc and projecting forwardly therefrom outside of said circle and offering rests for tools clamped onto said disc by said bolts, said rake adjusting posts having their rear ends spaced from rear ends of the openings, and locking means engageable in the openings back of said rake adjusting posts for non-revolvably securing said disc in corresponding operative position of tools clamped by said bolts onto said disc.

2. A turret tool post comprising a block, a holder for a plurality of tool thrustwise but rotatably mounted on said block and having holes angularly spaced in a circle corresponding to the positions for tools on said holder, a spring actuated plunger mounted on said block and adapted to project from a withdrawn position into any one of said holes when aligned therewith, a handle lever mounted to swing about the axis of the plunger for reciprocating said plunger to retracted and extended positions, and members associated with the holder and the lever for turning the holder when the lever is swung in its plunger-extending direction.

3. A turret tool post comprising a block, a holder for a plurality of tools thrustwise but rotatably mounted on said block and having sockets angularly spaced in a circle corresponding to the positions for tools on said holder, a spring actuated plunger mounted on said block and yieldably held extended for engagement in any one of said sockets when aligned therewith, a handle lever fulcrumed to swing about the axis of said plunger and having a cam for engaging a companion portion of the plunger and retracting said plunger when the lever is swung in one direction, and companion members carried by the lever and the holder for turning the holder when the lever is swung in the opposite direction.

4. A turret tool post comprising a block, a holder for a plurality of tools having a spindle thrustwise but rotatably mounting the holder on said block, said holder having holes angularly spaced in a circle corresponding to the positions for tools on said holder, a spring actuated plunger mounted on said block and slidable longitudinally thereof to project from a withdrawn position into any one of said holes when aligned therewith, a pin carried by said plunger transversely thereof, a handle lever fulcrumed to swing about the axis of said plunger and retracting the plunger when the lever is swung in one direction, and a pawl carried by said lever and yieldably held in position for engaging said ratchet and turning the spindle and the holder as the lever is swung in an opposite direction to permit return of the plunger to its extended position.

5. A turret tool post comprising a block, a holder for a plurality of tool thrustwise but rotatably mounted on said block and having holes angularly spaced in a circle corresponding to the positions for tools on said holder, a spring actuated plunger slidable longitudinally of said block and adapted to project from a withdrawn position into any one of said holes when aligned therewith, a ratchet mounted to turn with said holder, a handle lever mounted to swing about the plunger and having a cam for reciprocating said plunger, said lever having a pawl for engaging the ratchet of said holder, said plunger having a portion engaging the cam for withdrawing said plunger by cam action when the plunger is swung in one direction, and said pawl rotating said holder by engagement with said ratchet when the handle is swung in the opposite direction.

6. In a turret tool post, a block, a disc adapted to support a plurality of tools, a spindle thrustwise but rotatably mounting the disc on said block, said disc having tapered holes therein arranged in a circular path, a retractible plunger slidably mounted in a bore formed in said block and having a tapered end for fitting into said holes, a bushing in the bore through which said plunger passes having a portion projecting rearwardly from the block and formed with opposed longitudinally extending slots, a pin carried by said plunger and passing through the slots, a spring in said bore engaging said bushing and said plunger and yieldably holding the plunger extended for engagement in any one of the holes when aligned therewith, a lever for retracting said plunger mounted for swinging movement about the projecting rear portion of said bushing and having cams for engaging end portions of said pin and shifting the plunger to a retracted position, a ratchet carried by said spindle, and a pawl extending laterally from said lever for engaging said ratchet and turning the spindle when the lever is swung in one direction.

7. In a turret tool post, a block, a disc adapted to support a plurality of tools, a spindle thrustwise but rotatably mounting the disc on said block, said disc having holes therein arranged in a circle, a retractible plunger mounted in said block and having an end for fitting into said holes, a bushing through which said plunger passes, a spring yieldably holding the plunger extended for engagement in any one of said holes when aligned therewith, said bushing being formed with a longitudinal slot, a pin carried by said plunger and projecting radially therefrom and passing through the slot of the bushing, a lever for retracting said plunger mounted for swinging movement about the bushing and having a cam for engaging said pin, a ratchet carried by said spindle, and a pawl carried by said lever and yieldably held in position for engaging said ratchet.

HENRY EDWARD KOEHLER.